F. KOHNLE.
PIN TICKETING MACHINE.
APPLICATION FILED APR. 30, 1906.

1,029,695.

Patented June 18, 1912.

WITNESSES:

INVENTOR.
Frederick Kohnle
BY
ATTORNEY.

F. KOHNLE.
PIN TICKETING MACHINE.
APPLICATION FILED APR. 30, 1906.

1,029,695.

Patented June 18, 1912.
8 SHEETS—SHEET 7.

Witnesses

Inventor
Frederick Kohnle
By
Attorneys

UNITED STATES PATENT OFFICE.

FREDERICK KOHNLE, OF DAYTON, OHIO, ASSIGNOR TO THE OHIO SAFE DEPOSIT & TRUST COMPANY, TRUSTEE, OF DAYTON, OHIO.

PIN-TICKETING MACHINE.

1,029,695.     Specification of Letters Patent.     Patented June 18, 1912.

Application filed April 30, 1906. Serial No. 314,456.

*To all whom it may concern:*

Be it known that I, FREDERICK KOHNLE, a citizen of the United States, residing at Dayton, in the county of Montgomery and State of Ohio, have invented certain new and useful Improvements in Pin-Ticketing Machines, of which the following is a specification.

My invention relates to an improved pin ticketing machine of the class shown and described in Letters Patent No. 762,322, dated June 14, 1904, and granted to The Automatic Pin Ticketing Machine Company of Dayton, Ohio, assignee.

One of the objects of this invention is to produce a simple and durable machine so constructed that by the operation of a slide, the following results are accomplished:— A strip of paper is fed into the machine under a printing press, a strand of wire is fed into a wire guiding device, both wire and paper are simultaneously fed by proper instrumentalities in such a manner that the exact predetermined lengths are fed at each successive return movement of the main actuating member. In the forward or downward movement of the slide the first operation is to strain and cut the wire, then the wire is bent by the bending tool into a staple, as the slide moves farther a staple driver engages the top of the staple and drives the same into the strip of paper previously fed under the platen. The printing press is operated to print tags in advance of their being fed under the anvil. The staple is bent over an anvil in advance of the action of the staple driver, which as it advances, engages and moves the anvil out of the way, at the same time coming in contact with the staple, finally forcing it down into the tag and clenching the limbs if desired. Before the staple is driven mechanism is operated by said slide to raise the clenching block on which the goods rest and by means of which the staples are properly clenched through the ticket and fabric. This forward or downward movement of the slide is operated by power, and preferably manually by a foot treadle. The return movement of the slide is operated preferably by a spring, the tension of which has been imparted thereto by the forward movement of the treadle mechanism, the operating spring being attached to the treadle rod and frame respectively.

The return movement of the slide effects the following steps in time movements:— the first being the release of the platen operating lever allowing it and the platen to drop back to the normal; second, operating the positive feed mechanism to simultaneously feed forward the wire and paper for a staple and tag, simultaneously with this movement the wire cutter and former and staple driver are retracted to the normal.

As shown in the accompanying drawings the inking roller traverses the bases of the type both on the forward and backward movement of the slide. This is not material except to obtain a simple construction of the inking device.

An object of my invention is to provide a pin ticketing machine with a pair of coacting rollers, one of which is yieldingly supported, and between which a strand of wire is fed with the rollers positively rotated at intervals relative to the operation of a main actuating member for feeding an appropriate length of wire to the staple forming mechanism. The wire is severed by cutter mechanism likewise operated at an interval relative with the operation of the main actuating member for cutting proper lengths of wire to be formed into staples and secured to tags formed and printed by the machine.

Other objects of the invention are more fully set forth in the description of the accompanying drawings, forming a part of this specification, in which:—

In the accompanying drawings a pin ticket machine is shown in the preferred form of construction, in which the head carrying the slide, the stapling, ticket mechanism and other operative parts are mounted on a hollow pedestal 1, (see Fig. 19), in the base of which is pivoted a treadle 2, which actuates the mechanism. Upon the rear end of the pedestal base is journaled a pilot wheel or roller 3. The location and position of this roller is such that the machine may be rocked off of the base, suspended upon and moved by the travel of the roller, which is of great convenience in moving the same from place to place.

4 represents a connecting rod pivoted at one end to the treadle and projecting up through the slot 5, in the base plate 6, of the head and adapted to be connected to the operating slide, hereinafter described.

7 represents a coil spring placed at one side of the connecting rod, one end of which is connected to the treadle and the other end to the upper end of the pedestal.

8 represents the paper casing in which is journaled the paper strip roll. 9 represents a similar case in which is journaled a roll of wire.

10 represents the wire guiding horn through which the wire is drawn by the feeding rolls.

11 represents a curved paper guide and support, guiding the paper to the feeding rolls.

12 represents the upright frame on which the ticket mechanism is mounted.

13, 14, represent the standards on which the feeding shafts are journaled, (see Figs. 6, 7, 8 and 9). 15 represents a through shaft journaled in said standards 13, 14. 16 represents a paper feeding roll fixed to shaft 15, the periphery of which is knurled. 17 represents a ratchet wheel on said shaft and made fast to the feed roll. 18 represents an oscillating arm journaled on shaft 15. 19 represents a ratchet wheel, (see Fig. 9), secured to the gear wheel 20 fixed to said shaft 15. 21 represents a wire feed roll mounted on the outer ends of said shaft 15, the periphery of which is knurled. 22 represents a shaft journaled to said columns 13, 14.

23 represents a coacting paper feed roll, the periphery of which is preferably smooth so as not to mar the printing surface of the tag slip.

24 represents a gear meshing with gear 20 on shaft 15.

25 represents a coacting wire feed roll having a knurled periphery.

In the operation of these feed rolls, they are required to be driven at certain predetermined times and relative speeds to coact with the printing and stapling mechanism and to remain at rest during the operation of printing and stapling. For this purpose the following mechanism is provided:—26 represents a feed arm rigidly secured to the slide 27 or main reciprocating member, (see Fig. 1), said member works in guides formed in the upright frame 12, said slide being actuated by the treadle and connecting rod. As before stated, the printing and stapling mechanisms are operated at the down or forward movement of the slide, the feeding mechanisms are operated by the return movement of said slide. For this purpose arm 26 is connected to the bottom of the slide 27. Upon the upturned end 28 of said arm is a slot in which is gibbed slide block 29 of the lifting arm 18. 30 represents a pawl pivoted to said arm 18 and engaging with ratchet wheel 19. As said arm is raised the pawl 30 engages with one of the teeth of the ratchet wheel 19 and drives shaft 15 one step movement, which in turn feeds the wire and paper, and by means of the gears 20 and 24 imparts motion to shaft 22 and coacting feed rolls 23 and 25, which respectively grip the wire and paper and positively feed the same the desired steps. It is absolutely essential that the feed rolls should be positively stopped at the end of the desired step movement. For this purpose pawl 31 (see Fig. 1), controlled by a spring 32, is provided so as to automatically engage with the teeth of ratchet wheel 17, the parts being so adjusted that the stop pawl acts just at the end of the travel of driving pawl 30. Pawl 31 has a cam surface 33 against which pin 34 comes in contact on the downward movement of arm 26 and trips the pawl 31. On the upward movement of arm 26, pawl 31 reengages with the ratchet wheel 17 before pawl 19 imparts feed motion to shaft 15.

It is absolutely essential to have the movements of the feeding devices start and stop at predetermined times, and it is also essential that the same exact amount of wire and length of paper strip be fed at each successive movement, so that the tag and staples will always have respectively the desired lengths, and also that the printing upon the successive tags shall be exactly at the same place, otherwise the tags would be neither properly printed nor properly stapled. To accomplish this result, I provide sufficient tension to make an absolute gripping of the feeding rolls on the surface of both the wire and paper. It is desirable also that tension be applied to the shaft near each end, so that each end of shaft 22 may be separately raised to insert separately the wire and paper strip.

35, (see Fig. 8), represents a sliding journal box for shaft 22.

36 represents a compression spring secured within the housing 37, and bearing on the journal block 35, which form a part of the journal cap. The cap screws 38, (see Fig. 7), draw this compression spring 36 firmly down upon the sliding journal blocks and impart sufficient friction to the bearing of the shaft 22, as to cause a gripping engagement of the tag feed rolls 16 and 23, and the wire feed rolls 21 and 25, thereby insuring an exact and positive length of both wire and paper at each forward movement of the feed shafts 15 and 22.

39 represents a lever for lifting the ends of shaft 22 for initial feeding. Said lever 39 being connected to an actuating rod 40, squared on one side, (see Fig. 8), and abutting the journal box 35, whereby a movement of lever 39 to either the right or left will impart an upward movement to the journal box, thereby releasing the frictional contact of the feeding rolls. A duplicate construction is carried out for support 14.

Figure 2:
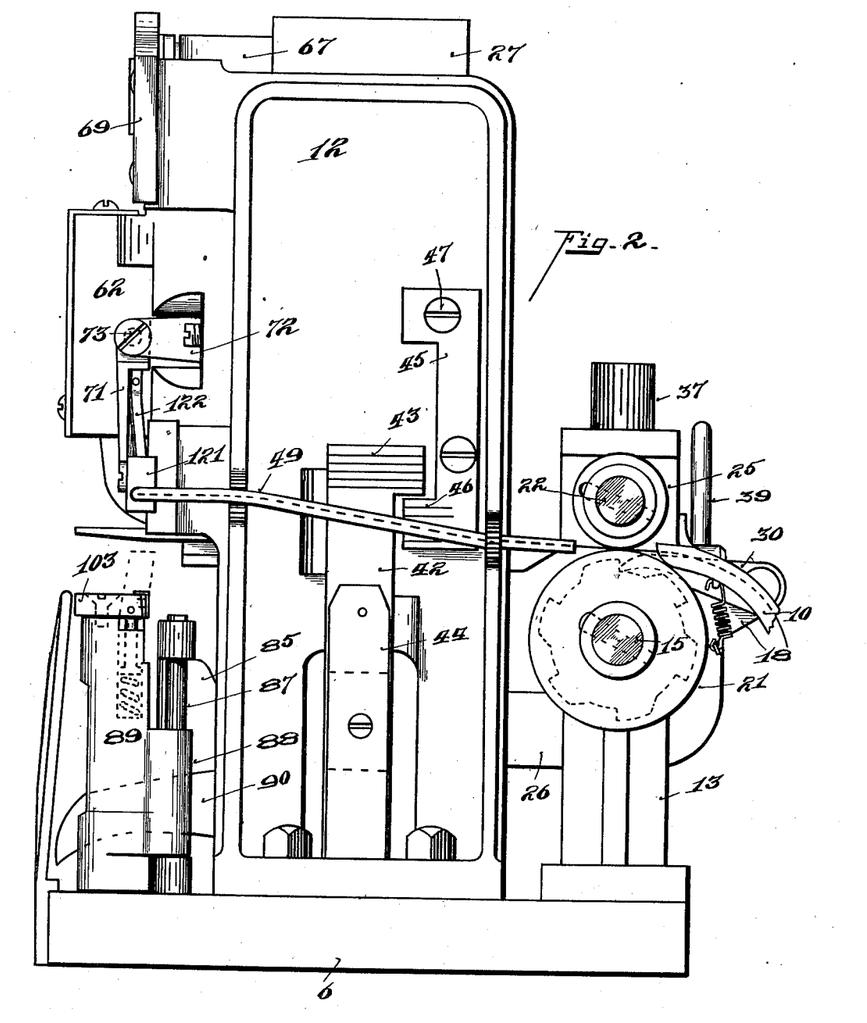
Fig. 2 is an elevation of the opposite side of the machine.
Figures 10, 11, 12, 13:
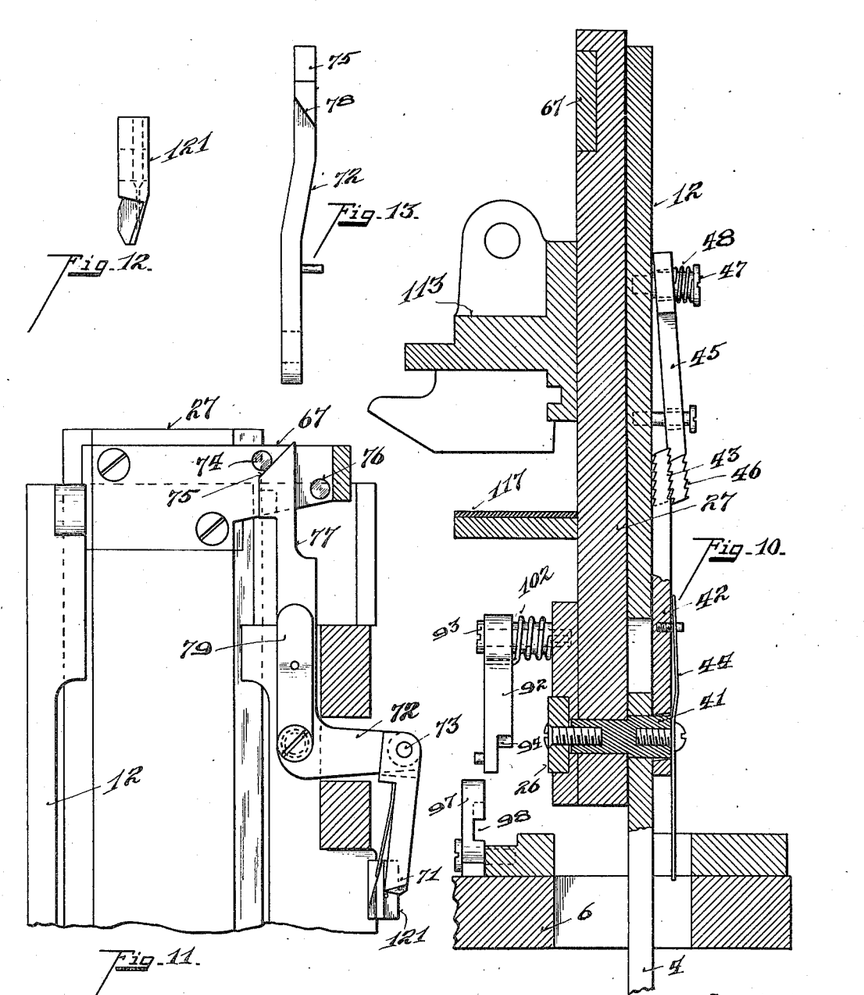
Fig. 10 is a section on line $v, v$, Fig. 7.
Fig. 11 is a section on line
Fig. 12 is a detailed top plan view of the stationary cutting blade.
Fig. 13 is an end elevation of the cutting blade actuating lever.
Figure 19:
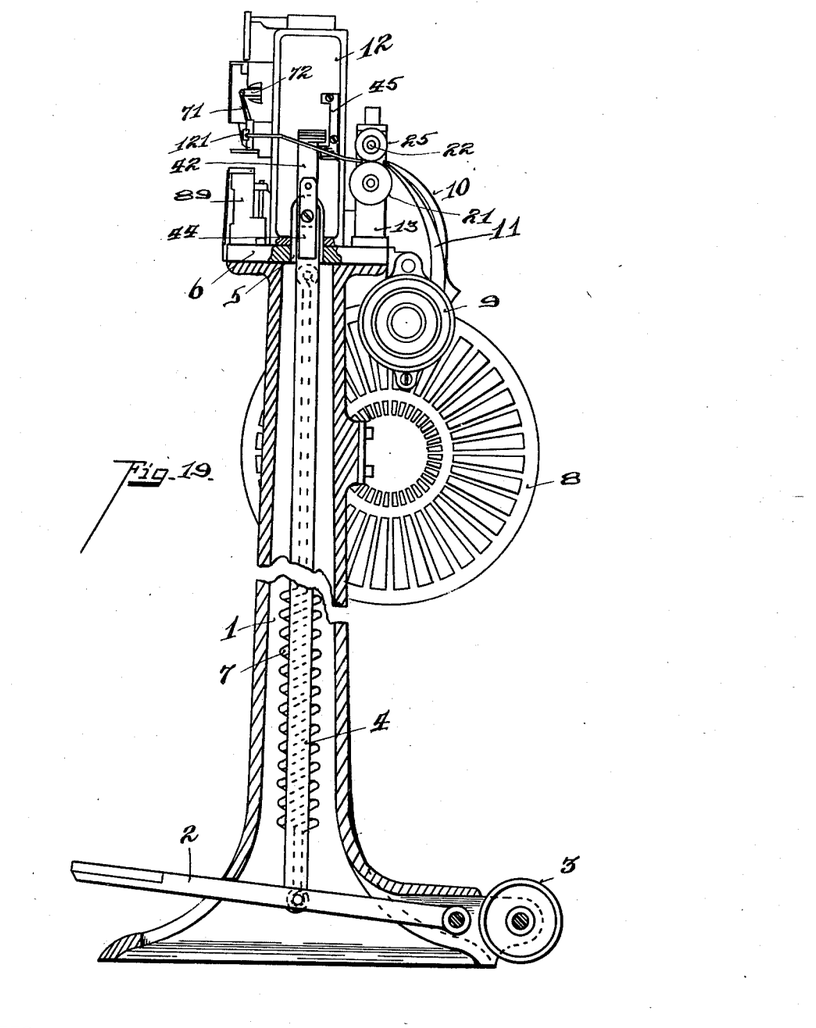
Fig. 19 is a central vertical section of the pedestal and its continued head, the head being partly shown in section.

In the operation of the machine in order to print and staple properly, it is absolutely necessary to make a full throw of the slide 27 in each direction, to insure the proper length of ticket, feed of wire and the complete operation and restoration of the various operative elements. To accomplish this the following mechanism is provided:— Connecting rod 4 projects up through the base 6, as shown in Fig. 19, and is connected to the slide 27 by pin 41. Upon said pin is mounted plate 42 having at its upper end a side projecting lug upon which are double faced serrations or ratchet teeth 43, said plate 42 is loosely journaled on the pin 41, and held up against the connecting rod 4 by means of the spring 44. 45, (see Figs. 2 and 10), represents a coacting plate having a similar lug, on each side of which are hooked serrations 46, as shown in Fig. 10, having engagement with the serrated faces 43. Said plate 45 is secured to the frame by pin 47 loosely supported thereon and controlled by a spring 48. The two plates 42 and 45 are hung in different planes, as shown in Fig. 2, and their engagement is with the side projecting serrated lugs, (see Fig. 10). In Fig. 10, slide 27 is shown having made a partial downward movement. The edges of plates 42 and 45 are beveled respectively so that the edges will slide past each other, the said plates yielding to bring the ratchet shaped teeth in engagement with each other and thereby locking the slide against an upward movement, until a complete stroke has been made and the engagement between the plates 42 and 45 has been broken. The said plates ride over each other in like manner on the reverse or return movement, locking slide 27 against any downward movement until the full up-stroke has been made. This locking of slide 27 against partial return movements until a full stroke each way has been made, is a very important advantage in the operation of this device, as a partial return movement in either direction of the slide 27 would derange the respective step motions. It will be observed that the serrated faces of the two members on the inside are the reverse of the serrations upon the outer faces, and it is on the down stroke that the serrations 43 ride upon the inside of those on the plate 45, and on the return stroke the said serrations 43 pass up upon the outside of the plate 45, so that a partial movement is locked against a return until the end of a full stroke in each direction is made.

In the operation of the machine the wire is fed in between the feed rolls 21 and 25, thence through the guide 49, through the slot in the limbs of the staple former 50. The gripping of the wire feed rolls is such as to hold the wire firmly in position ready for the operation of cutting and stapling.

In the preferred form of construction the staple bender 50 is a cylindrical shell 51 for the main body portion, and is provided with a longitudinal slot 52 formed in the two limbs 53 at the lower end for holding and bending the wire and an upright limb 54 projecting up into the guide head 55. Said guide head is provided with a recess into which is seated and pivoted the cam 56. 57 represents a spring actuated pin seated in said head 55. 58 represents a corresponding recess in the limb 54 into which said pin 57 automatically engages and disengages with and from in the operation, as will be presently described. 59 represents the staple driver which is a cylindrical rod rigidly secured to the head 55 and traveling in said shell 51 for its guide. In order to insure a firm support for these parts, I provide two guide rods 60, 61, rigidly secured to said head 55 and which travel in bores formed in bracket 62 forming a part of the upright frame 12, that bracket overhangs the platen 63, see Fig. 18. 64 represents a swinging anvil hinged to said bracket 62 the forming end normally resting between the limbs 53 of the staple bender 50. It is provided with a slot 65 through which the wire passes which is opposite the slots 52 of the bender 50. The inner face 66 of said anvil is inclined so as to allow the ready pulling off of the staple which is bent over the same by the bender 50, as will be hereinafter described.

Figure 1:
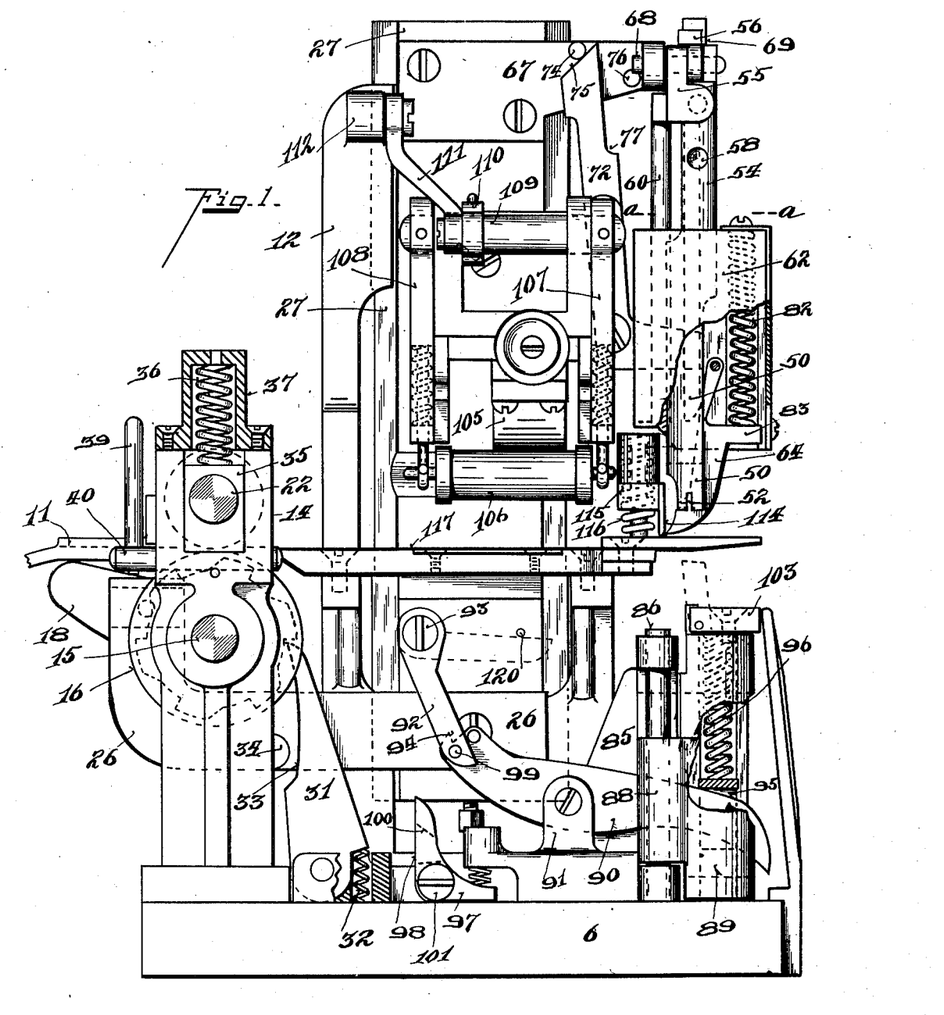
Figure 1 is a side elevation of the head of my improved pin ticket machine, with some of the parts shown in section.
Figures 3, 4, 5:
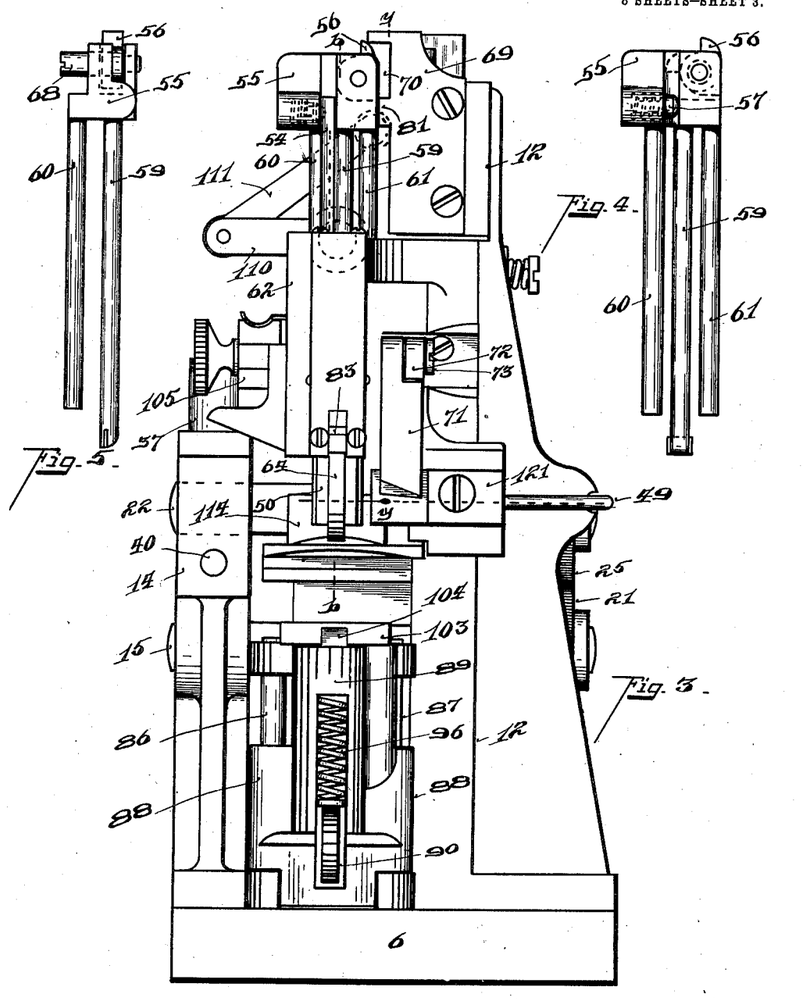
Fig. 3 is a front elevation of the machine.
Fig. 4 is a detailed front elevation of the staple driving mechanism.
Fig. 5 is a side elevation thereof.
Figure 6:
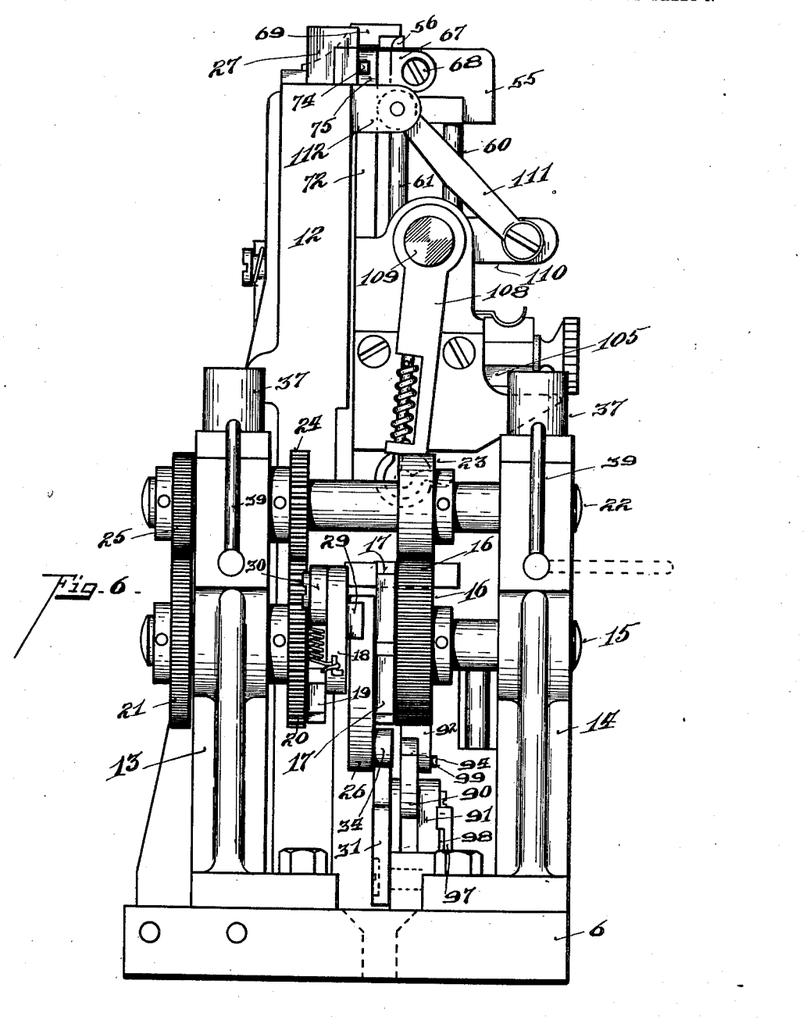
Fig. 6 is a rear elevation of the machine.
Figure 7:
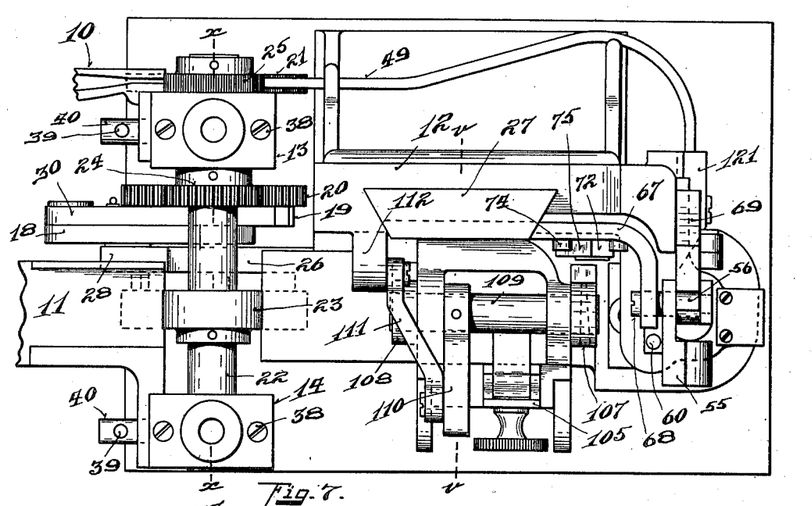
Fig. 7 is a top plan view of the machine.
Figures 8, 9:
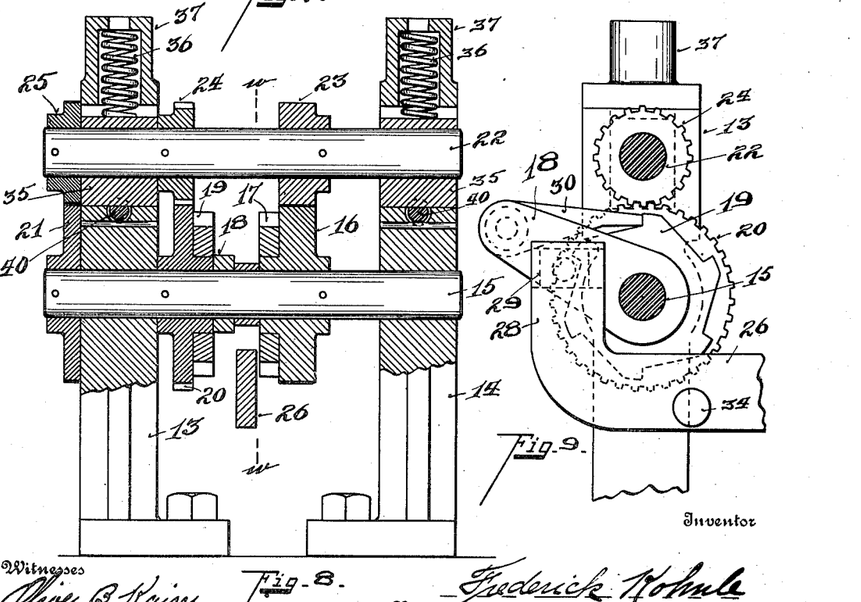
Fig. 8 is a section on line $x, x$, Fig. 7.
Fig. 9 is a section on line $w, w$, Fig. 8.
Figures 14, 15, 16, 17, 18:
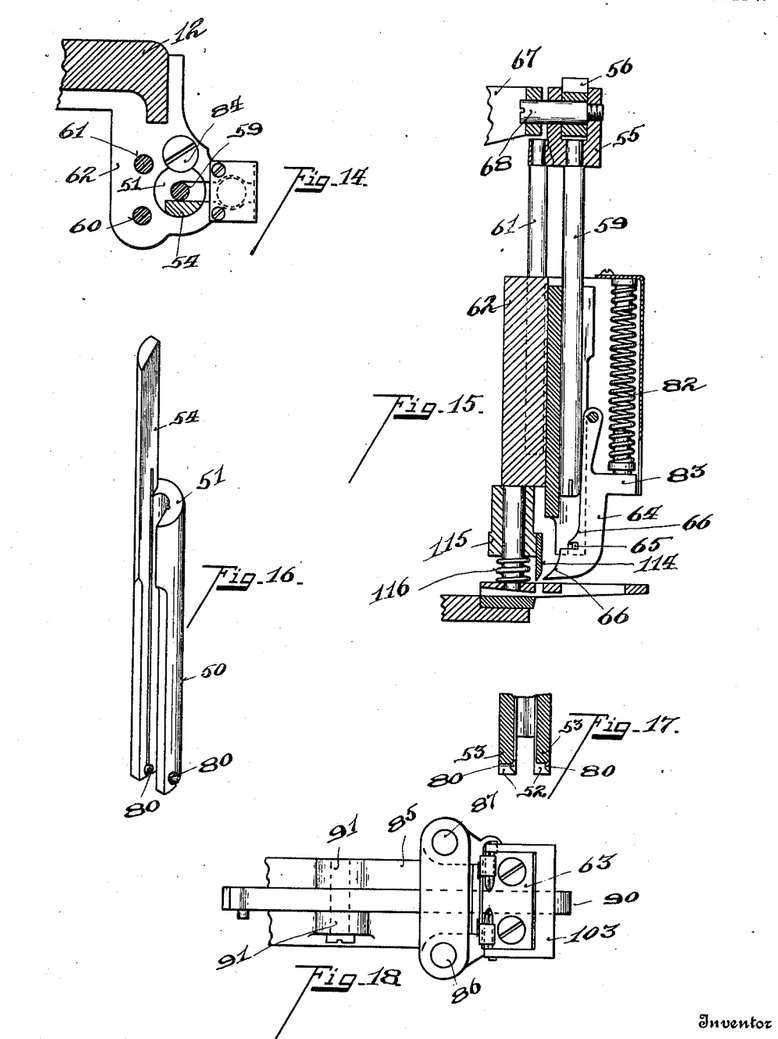
Fig. 14 is a section on line *a, a*, Fig. 1.
Fig. 15 is a section on line *b, b*, Fig. 3.
Fig. 16 is a perspective view of the staple bender.
Fig. 17 is a detailed sectional view of the lower portion of the staple bender.
Fig. 18 is a top plan view of the clenching block mechanism.

These staple forming and driving mechanisms are operated as follows:—Upon the top of slide 27 is mounted an arm 67 projecting forward and bent at right angles and connected to the head 55 by a screw bolt 68, as shown in Figs. 1, 7 and 15, so that the head 55 and its attached parts are operated by the said slide 27. 69, (Fig. 3), represents a plate secured to the frame 12 and is provided with a notch 70 into which the cam 56 normally passes. It will be observed that the shell bender 50 normally has no connection with the head 55, but rests against the spring actuated pin 57, the friction of which allows a slight movement when the slide 27 commences to move down. When the head 55 and its attached parts, driver 59 and guides 60, 61, are moved down, the friction of the pin moves the former down slightly until the wire which lies within the slots is properly strained for cutting, which will arrest the movement of the bender 50 until it is independently moved by the cam 56. The wire is severed at this time by the shear blades 71 actuated by the bell crank lever 72 to the free end of which the blade is attached by pivot 73. The bell crank lever 72 is actuated by the pin 74 on the side arm 67 striking the inclined face 75. Pin 76 strikes the circular cam face 77 and throws the bell crank lever back to normal. In order to prevent the pin 74 from operating the bell crank 72 on the up-stroke, the inner face of the head of the bell crank lever 72 is provided with an incline 78, (see Fig. 13), allowing the bell crank to remain in its normal position. The spring 79 allows the bell crank 72 to move laterally slightly and returns it to normal. 121 represents a plate secured to the frame 12, through which the wire is fed. The front or free end of said plate being beveled and in line with the shear blade 71. 122 represents a spring fixed to the shear blade, its free end projecting downward in rear of the plate 121 for maintaining the shear in frictional contact with the plate 121, (see Figs. 2, 3, 11, 12). 49 represents a tube through which the wire is fed from the feed rolls 21, 25, to the plate 121.

It is necessary for the bender 50 to stand normally with the limbs 53 in position to receive the wire as it is fed forward. For this purpose each of the limbs are provided with a conical threading eye 80 upon the threading side of the limbs 53, so as to guide the wire into the slots and hold it in proper position for severing and then bending the same. In order to bend the staples an independent advance of the bender 50 is made by the following devices:—Cam 56 is brought into action by the lug 81 of the plate 69, (see Fig. 3), striking the heel of the cam, throwing it over upon the top of the bender and holding it in contact during the passage of the cam across the face of the lug 81, thus driving the bender 50 downward a sufficient distance to bend the staple, and it is during the period of cam engagement only that the cam is positively driven. As soon as the cam is released it remains at rest until the up stroke of the main actuating member. The adjustment of the parts and the length of the wire are such that the limbs of the staple are brought down just above the tag. As the head 55 continues to move down the staple driver 59 strikes the bow of the staple and drives it through the tags and the fabric to which it is to be attached. This action of the staple driver moves the wire off of the anvil 64 swinging it back free of the staple. 82 represents a spring resting on the lug 83 which is compressed by forcing back of the anvil former and returns it back to normal position between the limbs 53 when the staple driver is retracted by the up-stroke of the slide. When the full down stroke is completed the spring 7, (the pressure on the pedal being released), retracts the slide 27 making the up-stroke. During this up-stroke the spring actuated pin 57 engages with the conical recess 58, raises the bender 50 to its normal position, bringing the shell portion 51 against the stop screw head 84, which limits the upward travel of the former causing the spring actuated pin 57 to be disengaged from the recess 58, and the head 55 with its attached parts is raised to the uppermost normal position.

In the preferred form of mechanism for clenching the staples, the following instrumentalities are employed:—85 represents a support mounted upon the base plate 6, provided with the rods 86, 87, to which are slidably mounted the ears 88, formed integral with the clenching block frame 89, forming guiding instrumentalities therefor. This frame 89 is slotted, through which the lifting lever 90 projects, said lever 90 is hinged to the ears 91 formed integral with the support 85. The lifting lever 90 is actuated by a link arm 92 pivotally mounted at 93 to the slide 27 and moving vertically therewith, said link arm and lever being notched and adapted to engage with each other, as shown at 94, Fig. 1, whereby when the slide 27 moves down, the rear end of lever 90 is depressed raising the forward end for actuating the clenching block frame. 95 represents a yoke straddling the free end of the lever 90 and mounted in a groove formed in the clenching block frame and adapted to slide vertically therein. 96 represents a coil spring, one end of which seats upon the yoke 95, the opposite end bearing against the clenching block 63. Said clenching block 63 being rigidly secured to the frame 89. This construction forms a yielding support for the clenching block, the function of which is as follows:—The fabrics to be ticketed vary in thickness and it is desired when thick goods is to be tagged to allow the clenching block to yield so as to save the adjusting of the clenching block to different positions according to the thickness of the material. The adjustment of these levers is such that the clenching block is raised at the time the staple is formed and before the driving of the staple. The clenching block and lever 90 are held in position until after the stapling is completed and until the up-stroke commences. The clenching block is retracted at the beginning of the up-stroke by the following mechanism:—97 represents a tripping pawl, the inner face of which is provided with a slot 98, shown in dotted lines Fig. 1, and in elevation Fig. 6, into which the pin 99 of link arm 92 enters, first, striking the inclined face 100 of pawl 97, moving it back on its pivot 101 and engages with the end of the slot as it is disengaged from its connection at 94 with lever 90. This allows the lever 90 to be forced back to normal position by the weight of the clenching block frame 89. The position of these parts is shown in Fig. 1. The pivot of link arm 92 is fixed to the slide 27 and extends therefrom in order to aline the link arm in position to actuate the lever 90 and the pin 99 of the link arm 92 to engage with pawl 97. 102 represents a coil spring, (see Fig. 10), one end of which is secured to the link arm 92, and the opposite end to the slide 27 for automatically returning the link 92 to its normal position engaging the lever 90 after it has been released from the pawl 97 in the upward movement of the slide 27.

When it is desired to staple a tag without clenching the same, the notched end of lever 90 is depressed by hand which will permit the link arm 92 to swing upward by the tension of the spring 102 and assume a position, as shown in dotted lines Fig. 1, and engage the stop pin 120 fixed to and projecting from the slide 27. The disengagement of link arm 92 from lever 90 maintains the clenching block frame 89 normally idle in a position free from engaging the staple, in the downward or forming movement of the slide 27, and allows the stapling of a tag without clenching the limbs thereof and permits the stapled tag to be applied to the goods by hand. 103 represents a yoke, (see Figs. 1 and 18), pivotally secured to the clenching block 63 and adapted to be swung in a vertical position, as shown in dotted lines in Fig. 1. 104 represents a notch formed in the under face of said yoke and in a position adapted to guide the limbs of the staple as they are being forced through the tag and prevents the spreading of the limbs of the staples and leaves them perfect in shape for hand stapling. This is a great convenience and very desirable because with some articles of merchandise it is desired to put the tag on such a part of the goods that it could not be conveniently attached by the machine. Again, sometimes odd tags are provided to be used in some parts of the stores where it would be more convenient to attach the tags in the room where the goods are stored than it is to carry the goods to the marking department. Various other similar circumstances occur that make it extremely desirable to use this machine in its two-fold manner.

In the accompanying drawings the type chase 105 is shown in outline in Figs. 1 and 7, but the details of the same are not shown as they are constructed substantially as shown and described in Letters Patent No. 762,322, granted June 14, 1904, to which reference is made for a full description thereof.

106 represents the inking roll supported upon arms 107, 108, constructed substantially as shown and described in Letters Patent No. 762,322, of June 14, 1904. This inking roll is oscillated in the present instance to ink the type as follows:—107, 108, represent, (see Figs. 1, 7 and 10), arms upon the free ends of which the inking roll is journaled, said arms being fixed to a rock shaft 109 journaled in bearings in the type chase frame 113, said type chase frame being fixed to and adapted to move with the slide 27. 110 represents a link fixed to the shaft 109, and 111 represents a link pivotally connected at one end with the free end of link 110, the opposite end of link 111 being pivotally connected to an ear formed integral and projecting from the frame 12. Thus a downward movement of the slide 27 will cause the shaft 109 to be rocked by links 110 and 111, swing arms 107 and 108 forward carrying the roller underneath the face of the type inking the same. Said inking roll remains in such forward position during the entire downward movement of the slide and returns to its normal position by the upward movement of the slide 27.

From the foregoing description it will be seen that the reciprocation of the slide produces the following step time movements on the forward or downward stroke, (the wire and paper being fed in position).

Mode of operation:—Down stroke of the slide 27: 1. To bring the staple former in position to staple the wire. 2. Then moving the bell crank lever 72. As the stroke continues the staple driver is advancing within the staple bender. 3. The staple bender 50 is advanced by the action of the pawl 56, bending the limbs of the staple over the anvil 64. 4. The advance of the staple driver contacts with the face of the anvil 64 and with the loop of the staple pushing the former back out of its path. 5. The clencher block is lifted into position by the arm 92 and lever 90. 6. The staple is driven. 7. At this instant the paper severing knife 114 is driven by the contact of plunger rods 60, 61, engaging the knife support 115, (see Figs. 1 and 15), depressing the same, the spring 116 automatically retracts the knife on the up-stroke. 8. The inking arms are oscillated. 9. The type chase is brought down upon the platen 117, (see Fig. 2) and stamps impressions on the tag. 10. The operating arm 92 is disconnected from the lifting lever 90 and engages with the tripping pawl 97. 11. The arm 92 is disconnected by the tripping pawl 97, and held in position for the up-stroke.

On the up-stroke of slide 27, the following time movements take place:—1. The lever 90 is tripped, the clenching block drops in position. 2. The head 55 commences to rise with the slide. 3. Releases the contact of plungers 60, 61, from contact with the knife support 115. 4. The spring retracts the knife, clearing the way for feeding the paper. 5. The wire and paper are automatically fed forward one step by the action of the driving pawl 30 and the stop pawl 31. 6. During this movement the wire former 50 is raised by the action of the spring pin 57. 7. The movement of the bender 50 is arrested by the stop 84. 8. Pawl 56 is moved back into position for the forward movement. 9. The bell crank lever 72 is brought into normal position for the down stroke movement.

In cutting, bending and driving staples taken from a roll of wire inserting the staples in the tags, it is necessary to employ fine wire of sufficient rigidity to allow the limb of the staples to be driven through the article to be tagged. Such wire when drawn from the roll is apt to curl or twist but it must be held straight to be properly formed into staples and driven through the article to be tagged. To accomplish this the wire must be positively held after being cut in the desired position for bending into staples and driving the same. There must be no imperfection in this operation. To accomplish this result positively and successively in the proper time periods it is readily and accurately accomplished as follows:—The staple bender is bifurcated, the distance between the limbs is the exact width of the nose of the anvil over which the wire is bent. Each limb of the bifurcated driver is provided with a conical eye 80 on the feeding side thereof. These eyes terminate in the slots of the limbs 53, which eyes and slots are exactly in the plane of the wire feed. The slots hold the wire in position laterally. The wire is supported vertically by the nose of the anvil. To more effectually hold the wire from bending, I provide a slot 65 in the anvil. The anvil and staple bender are normally in position to allow the wire to be fed through them on the return or up-stroke of the main actuating member. On the forward movement of said member the wire is severed, but held firmly in position and bent into staple form over the anvil by the travel of the bender 50. This feeding of the wire through the staple forming mechanism and holding it firmly in place after being severed is a very important feature of the invention.

In order that the stapling of each tag shall be applied in the same relative positions for each successive tag, it is essential that the wire and tag should be fed exactly in successive uniform lengths. To accomplish this, tension devices must be applied to the feeding roll which I have shown as adapted to feed both the wire and tag, so as to secure a positive feeding of both tag and wire.

In practice, it is desirable to have the wire from which the staple is formed cut exactly the same length as the length of the tag, but the length of the feed is, of course, due to the peripheral travel of the roll controlling the feed. As shown, they have the same peripheral surface and consequently the same length when proper tension is applied. The length, however, might be changed, that is, the wire may be made shorter by lessening the peripheral surface of the feed roll, but the same constant length of the tag and staple must be maintained due to a large number of successive feeds, in order that each succeeding staple may be driven through the printed tag at the same point.

Having described my invention, I claim:—

1. In a machine of the class described, a main reciprocating member, wire feeding rolls, means for applying tension thereto, means in connection with said reciprocating member for operating said rolls during one movement of said reciprocating member, in combination with wire severing mechanism, comprising a stationary member, through which the wire is fed, a vertically movable cutter engaging said stationary member, tension means for maintaining said cutter in engagement with said stationary member, and lever mechanism connected to said cutter, and means in connection with said reciprocating member, for operating and controlling the movements of said lever and cutter at predetermined points in the reciprocation of said reciprocating member.

2. In a pin ticketing machine, a main actuating member, wire and tag feeding mechanism, ticket stapling mechanism, tag cutting mechanism, in combination with wire cutting mechanism, comprising a stationary cutter member having an orifice, through which the wire is fed, a movable cutter member maintained under tension against said stationary member, and moving across said orifice, connections interposed between said movable cutter and main actuating member, operated at a predetermined interval in a movement of said main actuating member, and means carried by said main actuating member, to release said cutter mechanism, after a wire severing operation.

3. In a pin ticketing machine, a main actuating member, wire feeding mechanism, wire cutting mechanism, comprising a stationary member, an orifice through said member, through which the wire is fed, and provided with a cutter surface, a movable cutter in engagement with the cutter surface of the stationary member, a bell crank lever connected to said cutter, provided with cam surfaces adapted to engage with said main actuating member during an interval in the movement of said main actuating member, and means for disengaging said connection during the continued movement of said actuating member, after a wire severance.

In testimony whereof, I have hereunto set my hand.

FREDERICK KOHNLE.

Witnesses:
D. I. Prugh,
Anna E. Altick.